United States Patent [19]

Weaver

[11] Patent Number: 5,461,387
[45] Date of Patent: Oct. 24, 1995

[54] POSITION AND DIRECTION FINDING INSTRUMENT

[75] Inventor: Edward E. Weaver, Atlanta, Ga.

[73] Assignee: Georgia Tech Research Corporation, Atlanta, Ga.

[21] Appl. No.: 258,341

[22] Filed: Jun. 10, 1994

[51] Int. Cl.$^6$ .............................. H04B 7/185; G01S 5/02
[52] U.S. Cl. ............................................................ 342/357
[58] Field of Search .................................. 342/357, 442; 343/895

[56] References Cited

U.S. PATENT DOCUMENTS

| | | | |
|---|---|---|---|
| 4,366,483 | 12/1982 | Hagedon et al. | 343/113 R |
| 4,568,940 | 2/1986 | Diamond | 343/16 M |
| 5,003,316 | 3/1991 | Ostermiller | 342/429 |
| 5,030,960 | 7/1991 | Bartley | 342/427 |
| 5,107,269 | 4/1992 | Labozzetta | 342/77 |
| 5,146,231 | 9/1992 | Ghaem et al. | 342/429 |
| 5,300,936 | 4/1994 | Izadian | 343/727 |
| 5,346,300 | 9/1994 | Yamamoto et al. | 343/895 |

OTHER PUBLICATIONS

Dick Weeghman, "Magellan's Handheld GPS," The Aviation Consumer, pp. 9–11, Aug. 1, 1993.
Navtech Seminars, Inc., "Navtech Seminars & Book and Software Store" (1994).
Navtech Seminars, Inc., "Navtech Update" (1994).

*Primary Examiner*—Theodore M. Blum
*Attorney, Agent, or Firm*—Deveau, Colton & Marquis

[57] ABSTRACT

A position and direction finding instrument including a single, direction-finding, multimode antenna having at least four (4) arms for receiving RF signals from one or more satellites, a feed circuit connected to the direction-finding antenna for receiving signals from the antenna and for generating mode one and mode two signals, and a global positioning system (GPS) receiver having stored satellite ephemeris data for determining the latitude and longitude (position) of the GPS receiver and comprising electronic processing means connected to the feed circuit for determining a ratio of the magnitudes of the mode one and mode two signals relative to each other to determine a phase difference between the mode one and mode two signals, the electronic processing means determining a forward direction of the instrument from the phase difference between the mode one and mode two signals, the stored satellite ephemeris data, and the latitude and longitude of the GPS receiver.

9 Claims, 3 Drawing Sheets

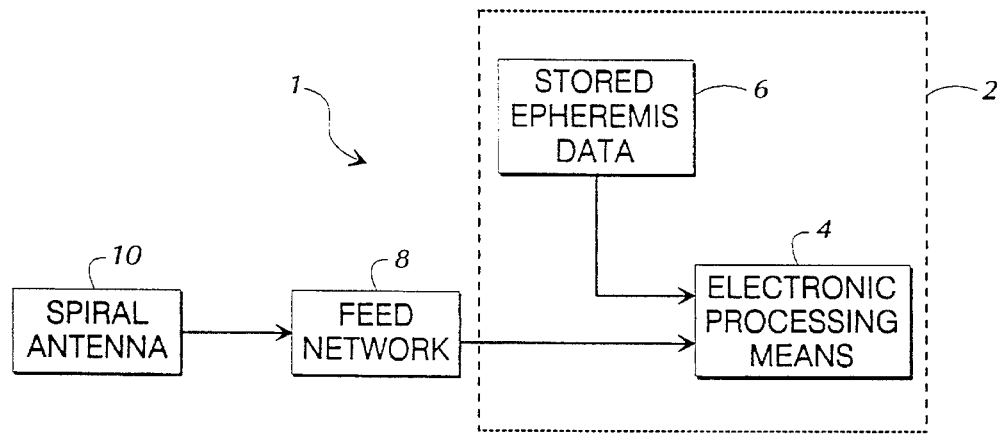
FIG. 1A
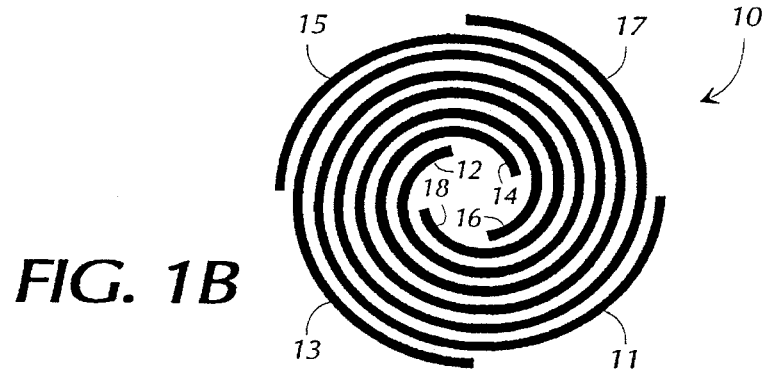
FIG. 1B
| ARM | MODE ONE | MODE TWO |
|-----|----------|----------|
| 12  | 0°       | 0°       |
| 14  | 90°      | 180°     |
| 16  | 180°     | 360°     |
| 18  | 270°     | 540°     |
FIG. 2
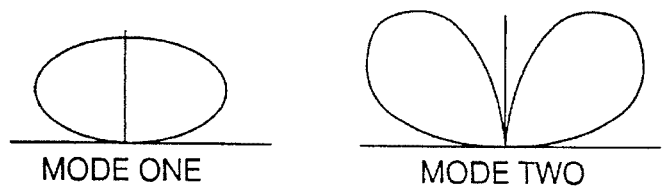
FIG. 3A  FIG. 3B

MODE ONE

MODE TWO

POSITION AND DIRECTION FINDING INSTRUMENT

BACKGROUND OF THE INVENTION

1. Field of the Invention

The present invention generally pertains to electronic communications and is more specifically directed to global positioning systems and direction-finding antennas.

2. Description of the Prior Art

Global Positioning Systems (GPS) and direction finders are well known in the art and separately provide latitude, longitude and altitude information, and pointing direction, respectively. As used herein, pointing direction is synonymous with the terms bearing, heading, azimuth, bearing angle, and antenna azimuth pointing angle, and these terms are used interchangeably to indicate a direction such as that determined by a magnetic compass. GPS utilized a system of twenty-four satellites, each of which has a radio frequency (RF) transmitter. GPS receivers decode the satellites' RF signals to calculate the latitude, longitude, and altitude of a position on the earth's surface. The particular orbits assigned to the satellites ensure that a GPS receiver located anywhere on the earth's surface (or on a ship or aircraft) will be able to receive RF signals from at least four satellites twenty-four hours a day. In addition to the typical latitude, longitude and altitude data, some GPS systems provide some direction information in one of three ways.

First, a few GPS systems use an array of either 3 or 4 antennas spaced several feet apart to provide direction information. The phase difference of the signals arriving at each of the antenna pairs is used to derive direction information. Roll, pitch and yaw information is provided by these systems. Unfortunately, these systems require a large surface, are not man portable, and are relatively expensive.

A second type of GPS system providing direction information is such one as that described in U.S. Pat. No. 5,146,231 which uses two antennas. One antenna has a sharp null in its azimuthal pattern. This antenna can be turned until substantially no signal is received. At that point, the null is pointing at a particular satellite. Unfortunately, GPS systems do not always have a large dynamic range and while the antenna null may be deep, in practice, background noise sometimes fills in most of the null and adds error and ambiguity to the measurements.

Third, some single-antenna GPS systems derive azimuth information from a comparison of previous positions. As long as the system is moving, the azimuth pointing data can be fairly accurate. However, if the system is stationary, the azimuth data cannot be derived. In other words, this scheme allows a direction of travel to be determined, but is not useful for determining an arbitrary direction while the GPS system is stationary.

Thus, there is a need for an instrument which has both position and direction finding capabilities and is also operable while the instrument is stationary so that an arbitrary direction may be determined. It is to the provision of such an instrument that the present invention is primarily directed.

SUMMARY OF THE INVENTION

The present invention meets the needs identified above by providing a position and direction-finding instrument which has a single multimode, direction-finding antenna with at least four arms for receiving RF signals from a global positioning system satellite. A feed circuit is connected to the direction-finding antenna for receiving signals from the antenna and for generating mode 1 and mode 2 signals. The invention further includes a GPS receiver which has satellite ephemeris data stored therein for determining the latitude and longitude of the GPS receiver. The GPS receiver has electronic processing means connected to the feed circuit for determining the magnitude and phase of the mode 1 and mode 2 signals. The electronic processing means also calculates a ratio of the magnitudes of the mode 1 and mode 2 signals relative to each other, and determines a forward direction of the instrument from a difference in phase between the mode 1 and mode 2 signals, the satellite ephemeris data, and the latitude and longitude of the GPS receiver. In this way, a GPS instrument is provided which has both position and direction finding capabilities and is operable while the instrument is stationary for determining an arbitrary direction.

Accordingly, it is a primary object of the present invention to provide a position and direction-finding instrument which is capable of deriving azimuth bearing angle information in addition to the normal longitude and latitude information provided by known GPS receivers.

It is another object of the present invention to provide a position and direction-finding instrument which is not affected by nearby steel, iron ore deposits or magnetic fields from nearby wiring.

A further object of the present invention is to provide an instrument which has utility in a variety of endeavors including sports, such as hunting and boating, military applications, aerospace technology, and navigation.

Still another object of the present invention is to provide a GPS receiver and antenna which is operational when the GPS receiver and antenna are stationary.

Yet another object of the present invention is to provide a position and direction-finding instrument which is sufficiently small in size to be considered hand-holdable.

These and other objects, features, and advantages of the present invention will become apparent upon reading the following specification in conjunction with the accompanying drawing figures.

BRIEF DESCRIPTION OF THE DRAWINGS

FIG. 1A is a block diagram of a position and direction finding instrument according to the present invention.

FIG. 1B is a graphical representation of a portion of the present invention in a preferred form, namely a spiral antenna with four arms.

FIG. 2 is a table of feed phases which may be applied to the antenna of FIG. 1B to generate antenna patterns.

FIG. 3A is a graphical representation of a mode 1 pattern generated by the antenna of FIG. 1B fed with signals having the designated phase difference shown in FIG. 2.

FIG. 3B is a graphical representation of a mode 2 signal generated by the antenna of FIG. 1B fed with signals having the designated phase difference shown in FIG. 2.

DETAILED DESCRIPTION

Figure 4A:
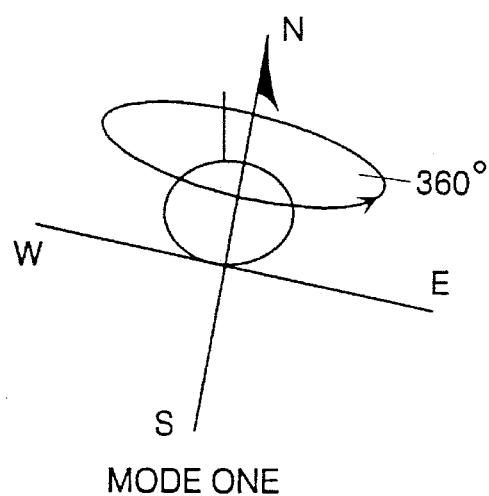
FIG. 4A is a graphical representation of the phase change which may be observed when the antenna element of FIG. 1B is operating in mode 1.

Referring now in detail to the drawings, wherein like numerals denote like parts throughout the several views, FIG. 1A illustrates a block diagram of a preferred embodiment of the position and direction finding instrument of the present invention. As shown in FIG. 1A, the present invention comprises a modified GPS receiver 2 which has electronic processing means 4 and stored ephemeris data 6 supplied to the electronic processing means 4. The modified GPS receiver 2 is connected to a spiral antenna 10 via feed network 8 which, in turn, is connected to the electronic processing means 4 of the modified GPS receiver 2.

FIG. 1B shows an antenna configuration 10 which preferably is a 4-arm antenna. FIG. 1B illustrates a typical geometrical relationship among the elements or arms 11, 13, 15, and 17 of a four-arm spiral antenna. A four-arm spiral antenna of the type depicted in FIG. 1B is capable of receiving RF radiation or signals from satellites in a global positioning system. The RF signals are fed to the center portions 12, 14, 16, and 18 of the spiral elements 11, 13, 15, and 17. Although the antenna depicted in FIG. 1B is the preferred antenna for use in conjunction with the present invention, there are several other antennas which may be used. These include, for example, other spiral antennas with four or more arms, sinuous antennas with four or more arms, modulated arm spiral antennas with four or more arms, conical spiral antennas with four or more arms, helical antennas with four or more arms, quadrifilar antennas with four or more arms, and volute antennas with four or more arms. These antennas are closely related in structure and electrical parameters having four or more arms that have been wrapped or folded into the designated geometrical configuration. For example, the arms of a spiral antenna such as that depicted in FIG. 1B are wrapped and/or folded on a flat surface. The arms of a conical spiral antenna are wrapped on a conical surface. The arms of the remaining antenna types are wrapped on a cylindrical surface. Although the pattern shapes and feed points for the antennas contemplated by the present invention differ somewhat, all of the antennas have in common the ability to be fed in a manner which generates mode 1 and mode 2 patterns, two dimensional representations of which are depicted in FIG. 3A and FIG. 3B, respectively. In this regard, it will be clear to those skilled in the art that a three-arm antenna, though more difficult, may be used to generate mode 1 and mode 2 patterns. The determination as to which antenna is selected depends upon the specific application intended by the user. The remaining discussion illustrates the present invention used in connection with the four-arm spiral antenna of FIG. 1B.

FIG. 2 is a table showing the different feed phases which may be fed to the center portions 12, 14, 16, and 18 of the arms of the spiral mode antenna of FIG. 1B in order to generate the mode 1 and mode 2 patterns illustrated in FIG. 3A and FIG. 3B, respectively. When the spiral mode antenna is transmitting, RF energy propagates outwardly along arms 11, 13, 15, and 17 until resonance occurs and the energy is radiated. As shown in FIG. 2, a mode 1 pattern is generated or launched by feeding the antenna arms so that the relative phase between the arms is 90°. Mode 2 is launched by feeding the arms so that the relative phase between the arms is 180°. The mode 1 pattern is a broad pattern that covers most of the sky while the mode 2 pattern has stronger lobes off axis but has a null located on the vertical axis as illustrated in FIGS. 3A and 3B, respectively.

The mode 1 and mode 2 patterns of an ideal antenna are symmetrical about the vertical axis. Each of the two antenna patterns can be described with a one dimensional array and the ratio of the magnitudes of the two patterns can be stored in one array. The processing schemes of the present invention derive the magnitude of the mode 1 and mode 2 signals. Then, the ratio of the measured mode 1 and mode 2 signals are used to "look up" or cross reference the elevation angle to a satellite or source of RF radiation in a stored table such as in the memory of a computer chip. The "look up table" may be set up or programmed for several different antennas or specifically programmed for use with a particular type of antenna for greater accuracy. When several satellites are used, pitch, yaw, and roll angles can be derived in addition to compass bearing angles by means known to those skilled in the art.

Figure 4B:
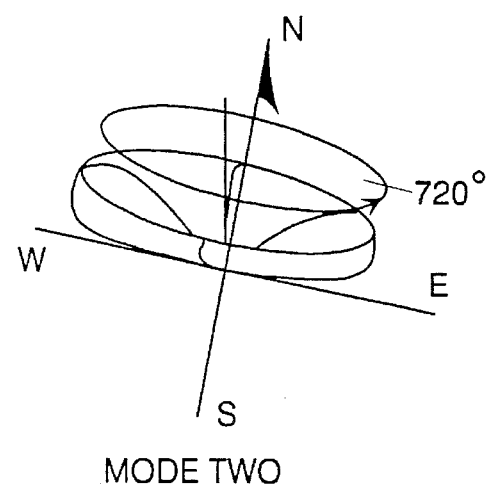
FIG. 4B is a graphical representation of the phase change which may be observed when the antenna element of FIG. 1B is operating in mode 2.

Referring now to FIGS. 4A and 4B, the phase shift phenomenon between the mode 1 and mode 2 patterns is illustrated. The phase shifts between the mode 1 and mode 2 patterns, in part give the spiral mode antenna its direction finding capability. The phase shifts observed in a conical cut or walk around an antenna replicates the feed of the antenna. As illustrated in FIG. 4A, 360° of phase change will be received as the antenna operating in mode 1 is rotated one revolution about its axis. On the other hand, mode 2 will give 720° of phase change as the antenna is rotated one revolution about its axis as illustrated in FIG. 4B. Thus, when the two modes are ratioed, and the antenna is rotated about its axis, 360° of phase change will be observed. Accordingly, it has been discovered that a position and direction finding instrument may be designed so as to utilize the phase shift between the two signals and derive the bearing angle to a RF source or satellite.

Several conditions should exist in order for the present invention to determine direction. In particular, satellite ephemeris data should be known, the position of the antenna should be known, and at least one satellite should be in the elevation angular region where the mode 1 and mode 2 patterns both have good gain characteristics. Satellite ephemeris data and the position of the antenna are necessary for any GPS receiver to derive a fix. Also, at least four satellites need to be in view for a fix to occur and the orbits of the satellites positioned so as to optimize triangulation. Therefore, it is extremely likely that the conditions necessary for operation of the present invention will always be met.

Figure 5:
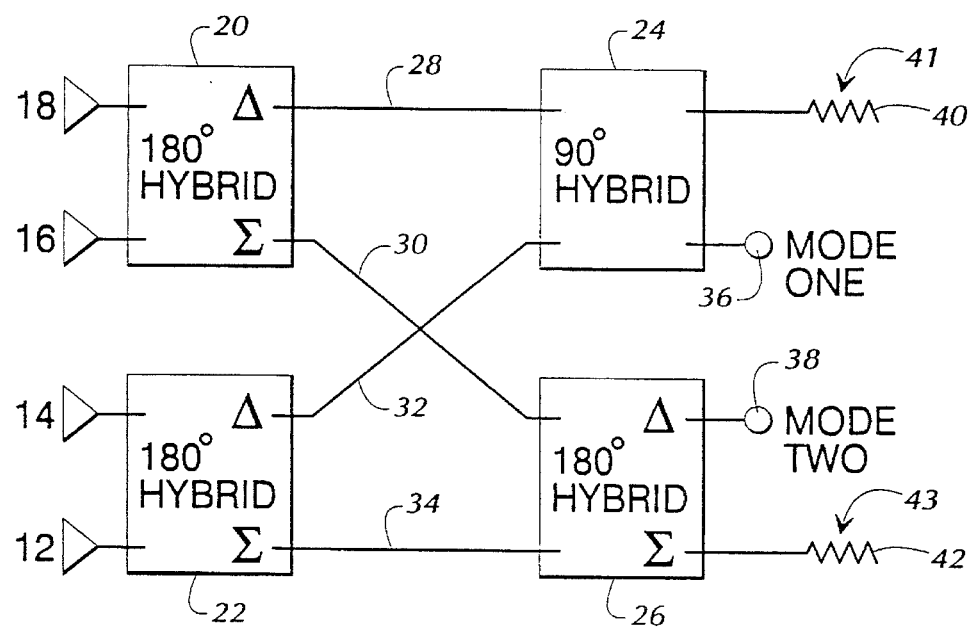
FIG. 5 is a schematic diagram of a feed network for receiving signals from the antenna of FIG. 1B and generating the mode 1 and mode 2 signals depicted in FIGS. 3A and 3B, respectively.
Figure 6:
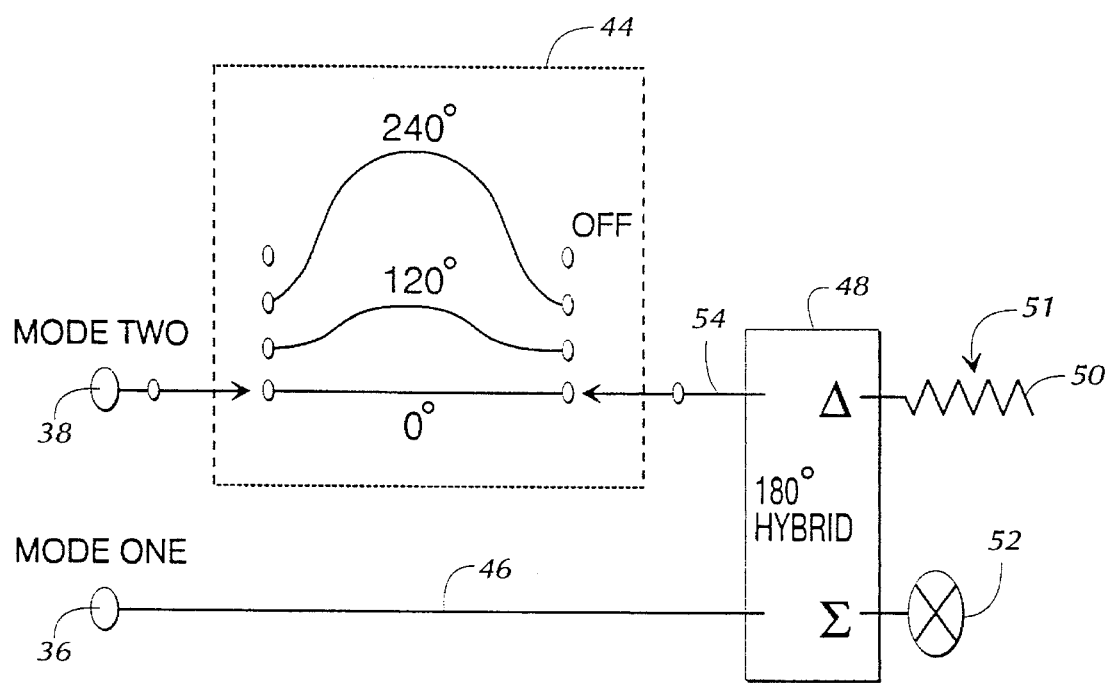
FIG. 6 is a schematic diagram depicting a method of deriving phase differences between the mode 1 and mode 2 signals generated with the feed network depicted in FIG. 5.

Referring now to FIGS. 5 and 6, an important feature of the position and direction finding instrument of the present invention is shown. FIG. 5 depicts the preferred feed network or circuit for generating modes 1 and 2 in a four-arm antenna. This arrangement generally comprises three (3) 180° hybrid combiners 20, 22, 26 and one (1) 90° hybrid combiner 24. For a 180° hybrid combiner having two inputs, A and B, the outputted signals would be A−jB at the difference output and A+jB at the summing output. For a 90° hybrid combiner having two inputs, C and D, outputs of C+D and C+jD would be provided.

Combiner 20 receives RF signals from antenna arms 15 and 17 and provides output signals on lines 28 and 30. The signal outputted to line 28 is the difference of the input signals from antenna arms 15, 17 while the signal outputted to line 30 is the sum of the signals received from antenna arms 15, 17. Combiner 22, similarly, receives inputs from antenna arms 11, 13 and provides output signals to lines 32, 34. The signal outputted to line 32 is the difference of the input signals received from antenna arms 11, 13, while the signal outputted to line 34 is the sum of the input signals received from antenna arms 11, 13.

The 90° hybrid combiner 24 receives inputs from line 28 and line 32, the difference outputs of hybrid combiners 20, 22. A mode 1 pattern is generated at terminal or output 36 of hybrid 24. Hybrid combiner 26 receives inputs from line 30 and line 34 corresponding to the summing outputs of hybrid combiners 20, 22. A mode 2 pattern is generated at the difference terminal or output 38 of hybrid combiner 26. Output 40 of hybrid 24 and output 42 of hybrid 26 are loaded with resistors 41, 43, respectively, so as to minimize or eliminate reflection.

The mode 1 pattern generated at output 36 of hybrid 24 is not degraded because of the existence of the mode 2 pattern generated at output 38 of hybrid 26 except for the losses incurred in the additional hybrids. Therefore, a GPS receiver used in conjunction with the present invention will have essentially its normal receiver signal-to-noise ratios when connected to the output 36 of hybrid 24, the mode 1 port.

Referring now to FIG. 6, a preferred arrangement for phase measurement in connection with the present invention is shown. In FIG. 6, a "six-port" phase measuring system is shown comprising a four-position switch 44 and a 180° hybrid combiner 48. The phase measuring system depicted in FIG. 6 derives relative phase between mode 1 signals at terminal 36 and mode 2 signals at terminal 38 by taking a sequence of power measurements at three positions of switch 44 corresponding to 0°, 120°, and 240°. For example, switch 44 is placed in the position corresponding to 0°, then a measurement is taken. Thereafter, switch 44 is changed to the position corresponding to 120°, after which another measurement is taken. Finally, switch 44 is changed to the position corresponding to 240° and a final measurement is taken. A fourth position is available on switch 44 corresponding for an off state wherein no measurements are taken.

Switch 44 is connected between the mode 2 port of hybrid 26, i.e., terminal 38, and the input line 54 to hybrid combiner 48. Mode 1 signals at terminal 36 of hybrid 24 are also provided as an input to hybrid combiner 48 via line 46. Phase measurements are taken at the summing output 52 of hybrid combiner 48 which is connected to a GPS receiver. The difference output 50 of hybrid combiner 48 is loaded with a resistor 51 so as to minimize eliminate reflection. The satellite signal-to-noise ratio is the only data needed in each position of switch 44 to derive the satellite/antenna azimuth angle. Thus, the present invention includes a convenient means of deriving phase from amplitude measurements of the mode 1 and mode 2 signals. It will be clear to those skilled in the art that there are many other ways to measure phase between two RF signals. Each method constitutes a compromise between complexity, speed, and accuracy.

Figure 7:
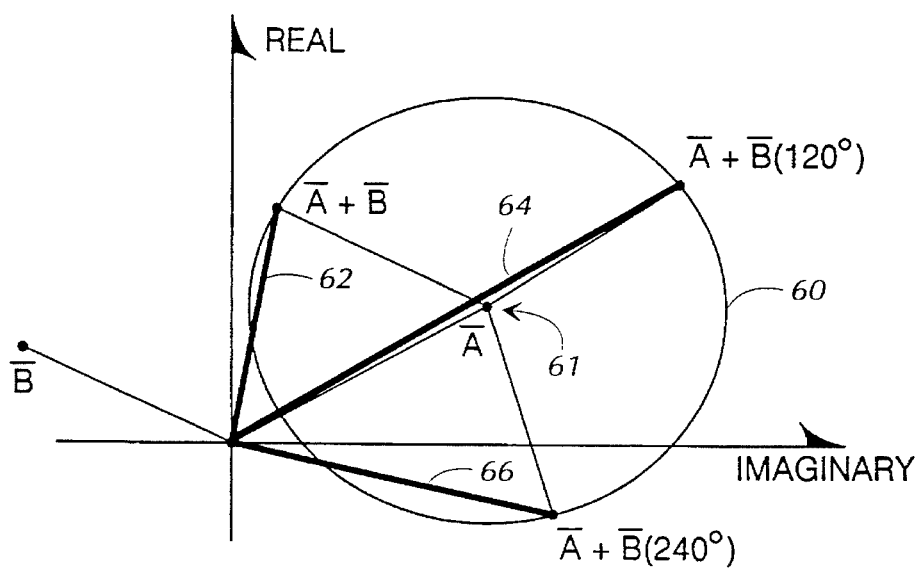
FIG. 7 is a graph illustrating the summation of two vectors corresponding to the measurement of the mode 1 and mode 2 signals as shown in FIG. 6.

FIG. 7 is a plot of two variables, A and B, in a coordinate system which will be used to further demonstrate the means by which the circuit of FIG. 6 is used to derive satellite/antenna azimuth angle from the mode 1 and mode 2 signals. As shown in FIG. 7, A and B are vectors which may be plotted in a coordinate system having an imaginary and a real axis. Vectors A and B may be summed with 0°, 120°, and 240° of phase shift added to vector B. The resulting sums plot a circle 60 with the terminus of A being at the center 61 of the circle. The satellite signal strength output is proportional to the length or magnitude of the heavy lines 62, 64, and 66 in FIG. 7 corresponding to A+B, A+B (120°), and A+B (240°), respectively. The resulting set of equations can be solved for A, B, and the phase shift between A and B.

The present invention provides a means of deriving the satellite/antenna azimuth angle from the actual phase shifts in each state of the phase measurement system depicted in FIG. 6. The derived azimuthal values may contain errors. These errors can be removed with one or more error tables that correlate actual azimuth angle and derived angle. Several error tables could be used where each error table represents a band of elevation angles. In the field, the error tables can be filled by placing the GPS system incorporating the position and direction finding instrument of the present invention on a horizontal surface pointing north (pointing at the north star). After a few hours, the movement of all of the satellites overhead will have presented enough viewing angles to fill the tables. Alternatively, the GPS system might calibrate itself as it is being moved. To accomplish this, the antenna used in conjunction with the present invention would have to be oriented on a vehicle, for example, so that the system knew the azimuth direction of the front of the vehicle. In a laboratory environment, the tables may be filled using a precision turntable and a RF source by means known to those skilled in the art.

A position and direction finding instrument has been described herein which is capable of deriving azimuth bearing angle information in addition to the normal longitude and latitude information provided by prior known GPS receivers. In addition, the position and direction finding instrument of the present invention has modest capabilities for determining pitch, yaw, and roll. Although the present invention as been described in detail with respect to a preferred embodiment thereof, it will be obvious to those skilled in the art that many modifications, additions, and deletions may be made therein without departing from the scope and spirit of the invention as set forth in the following claims.

What is claimed is:

1. A position and direction finding instrument comprising:

a single, direction-finding, multimode antenna having at least four arms for receiving RF signals from a satellite;

a feed circuit connected to said direction-finding antenna for receiving signals from said antenna and for generating mode one and mode two signals; and a global positioning system (GPS) receiver having stored satellite ephemeris data for determining the latitude and longitude of the GPS receiver and comprising electronic processing means connected to said feed circuit for determining a phase difference between the mode one and mode two signals, and for determining a forward direction of the instrument from the phase difference between the mode one and mode two signals, the stored satellite ephemeris data, and the latitude and longitude of the GPS receiver.

2. A position and direction finding instrument as claimed in claim 1 wherein said electronic processing means determines the phase difference between the mode one and mode two signals by calculating a ratio of magnitudes of the mode one and mode two signals relative to each other.

3. A position and direction finding antenna as claimed in claim 1 wherein said feed network comprises a plurality of combiners.

4. A position and direction finding instrument as claimed in claim 3 wherein said plurality of combiners comprises a plurality of 180° hybrid combiners and a 90° hybrid combiner.

5. A position and direction finding antenna as claimed in claim 1 wherein said antenna is a spiral-mode antenna.

6. A position and direction finding antenna as claimed in claim 2 wherein said electronic means further comprises data storage means for storing data indicative of azimuth and further comprising means for comparing the ratio of the magnitudes of the mode one and mode two signals with the stored data for calculating the forward direction.

7. A position and direction finding instrument as claimed in claim 3 wherein at least some of said combiners are provided with resistors for minimizing unwanted reflection.

8. A method of determining forward direction with a GPS receiver and GPS satellites using the receiver position and the satellites ephemeris data comprising the steps of:

receiving signals from at least one GPS satellite with an antenna;

applying the received signals to a feed network to generate mode one and mode two signals;

determining the phase shift between the mode one and mode two signals; and using the phase shift between the mode one and mode two signals, the satellite ephemeris data, and the position of the GPS receiver to determine forward direction.

9. The method according to claim 8 wherein said step of determining phase shift further includes the steps of:

measuring the magnitude of the mode one and mode two signals;

calculating the ratio of the measured mode one and mode two signals; and using the calculated ratios of the mode one and mode two signals to determine phase shift between the mode one and mode two signals.

* * * * *